United States Patent [19] [11] 4,403,129
Baker [45] Sep. 6, 1983

[54] FLUID ACTUATED ELECTRODE CLAMP

[75] Inventor: George E. Baker, Melton Mowbray, England

[73] Assignee: Amchem Company Limited, Sileby, England

[21] Appl. No.: 238,745

[22] Filed: Feb. 27, 1981

[30] Foreign Application Priority Data

Mar. 6, 1980 [GB] United Kingdom ............... 8007603

[51] Int. Cl.³ .............................................. B23K 1/08
[52] U.S. Cl. ................................ 219/69 E; 219/69 R; 204/225; 269/20
[58] Field of Search .................... 219/68, 69 E, 69 R, 219/69 M, 136, 137.44; 269/20, 22, 30; 204/225

[56] References Cited
U.S. PATENT DOCUMENTS 3,517,153  6/1970  Check ............................... 219/69 E
3,711,675  1/1973  Girardin ........................... 219/69 E
3,995,134  11/1976  Dudden ........................... 219/69 E
4,041,269  8/1977  Baker ............................... 219/69 E

FOREIGN PATENT DOCUMENTS 2704945  8/1977  Fed. Rep. of Germany .... 219/69 E
5410474  3/1979  United Kingdom ............. 219/69 E Primary Examiner—M. H. Paschall
Attorney, Agent, or Firm—Charles E. Brown

[57] ABSTRACT

An element, such as an electrode, to be clamped by a clamping device passes slidingly through the interior of a rigid tube, a portion of which is disposed in a fluid chamber defined within a body of the clamping device. A flexible tube, for example made of nitrile rubber, surrounds said portion of the rigid tube and the latter has a part thereof cut away to expose the electrode to the flexible tube. Fluid in the chamber can be pressurized to a relatively high level in order to press the flexible tube against the electrode and thereby clamp the latter firmly, or to a relatively low level in order to retain the electrode frictionally while allowing it to move through the rigid tube.

8 Claims, 3 Drawing Figures

FLUID ACTUATED ELECTRODE CLAMP

This invention relates to a clamping device and to apparatus for the electrical machining of a workpiece including such a clamping device.

According to one aspect of the present invention, there is provided a clamping device comprising a body defining therein a chamber in which a fluid is disposed, a through passage in said body for reception of an element to be clamped, said through passage having a portion which passes through the chamber and which is defined by the interior of a tube, at least a part of said tube being flexible, and means operative to pressurize said fluid whereby said part of said tube is deflected inwardly to clamp said element therein.

Preferably, said portion of said through passage is defined by the interior of a relatively rigid tube, a flexible tube surrounds said relatively rigid tube, and a part of said relatively rigid tube is cut away to expose said through passage to said flexible tube.

In one particular embodiment of the invention, said relatively rigid tube is made of an electrically conductive material, said element to be clamped is an electrode, and electrical power is supplied to said electrode by way of said relatively rigid tube.

Conveniently, a plurality of separate through passages are provided in said body for reception of respective elements to be clamped, each said through passage having a portion which is disposed in the chamber and which is defined by the interior of a respective tube, at least a part of each said tube being flexible.

Advantageously, said means is operative to pressurise said fluid selectively at a first pressure which causes firm clamping of said element and at a second, lower pressure which causes frictional retention of said element while allowing movement of said element through said tube.

According to a further aspect of the invention, there is provided apparatus for the electrical machining of a workpiece, comprising a plurality of electrodes and a clamping device, said clamping device including a body defining therein a chamber in which a fluid is disposed, a plurality of through passages in said body which receive said electrodes respectively, each said through passage having a portion which passes through the chamber and which is defined by the interior of a respective tube, at least a part of said respective tube being flexible, and means operative to pressurise said fluid and thereby deflect said part of each said tube inwardly to clamp the respective electrode, whereby said electrodes can be clamped by said clamping device or advanced through said through passages according to the pressure of said fluid in the chamber.

The invention will now be further described, by way of example, with reference to the accompanying drawings, in which.

Figure 1:
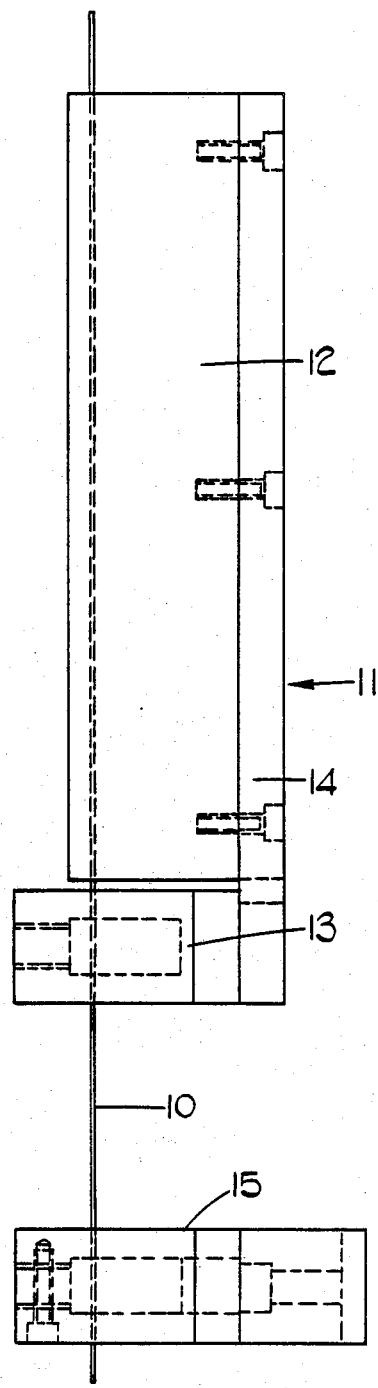
FIG. 1 is a side view of part of electrical discharge machining apparatus which includes two clamping devices according to the present invention.
Figure 2:
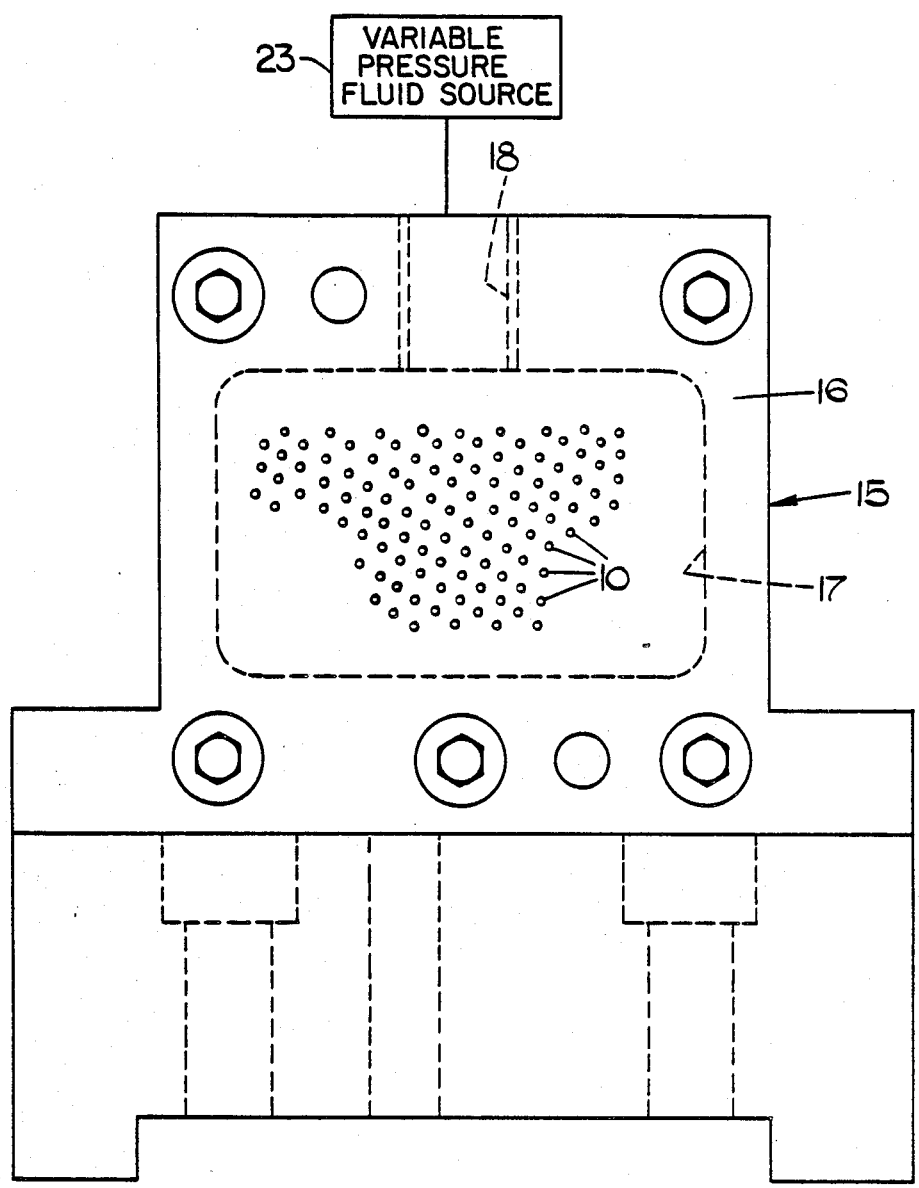
FIG. 2 is a plan view of one of the clamping devices.

Referring first to FIGS. 1 and 2, the electrical discharge machining (EDM) apparatus shown therein comprises a plurality of rod-shaped electrodes 10 (only one of which is shown in FIG. 1) which are mounted in a cartridge 11. The cartridge comprises a moulded storage block 12 having a plurality of passages therethrough in which the electrodes 10 are respectively received and guided, and a clamping device 13 secured to the block 12 by means of a backing plate 14. The electrodes emerging from the cartridge 11 are guided through a further clamping device 15 into a nose guide (not shown) which is disposed adjacent a workpiece to be machined. The clamping device is fixed relative to the workpiece, but the cartridge 11 can be moved towards and away from the clamping device 15 in the direction of extent of the electrodes. During a machining operation, the cartridge 11 is held stationary and the clamping device 13 is actuated to clamp the electrodes in position, the clamping device 15 being de-activated at this time.

During machining, ends of the electrodes 10 adjacent the workpiece become eroded away to different degrees, and it is necessary periodically to arrest the machining operation and re-align the electrode ends. This is done by releasing the clamping device 13 so that the electrodes are only frictionally held thereby, permitting the electrodes to slide relative to the clamping device 13. The cartridge 11 is then advanced towards the clamping device 15 so as to move the electrodes forwardly through the clamping device 15 and the aforementioned nose guide. As the end of each electrode comes into contact with the workpiece, such forward movement of the electrode is arrested permitting the clamping device 13 to slide relative thereto. Once all of the electrode ends have engaged the workpiece, the clamping device 13 is re-actuated whereupon machining can be commenced again.

After a number of such refeeding operations to re-align the electrode ends, the gap between the cartridge 11 and the clamping device 15 becomes insufficient to permit a further refeeding operation. Under this condition, the clamping device 15 is actuated so as to hold the electrodes 10 in position, the clamping device 13 is de-actuated and the cartridge 11 is retracted so as to increase its distance from the clamping device 15. Once the cartridge has reached a suitable position, the clamping device 13 is re-actuated and the clamping device 15 is de-actuated, whereupon machining of the workpiece can continue as described above.

In the above-described respects, the electrical discharge machining apparatus and the method of refeeding the electrodes are as claimed in U.S. Pat. No. 4,121,081.

Figure 3:
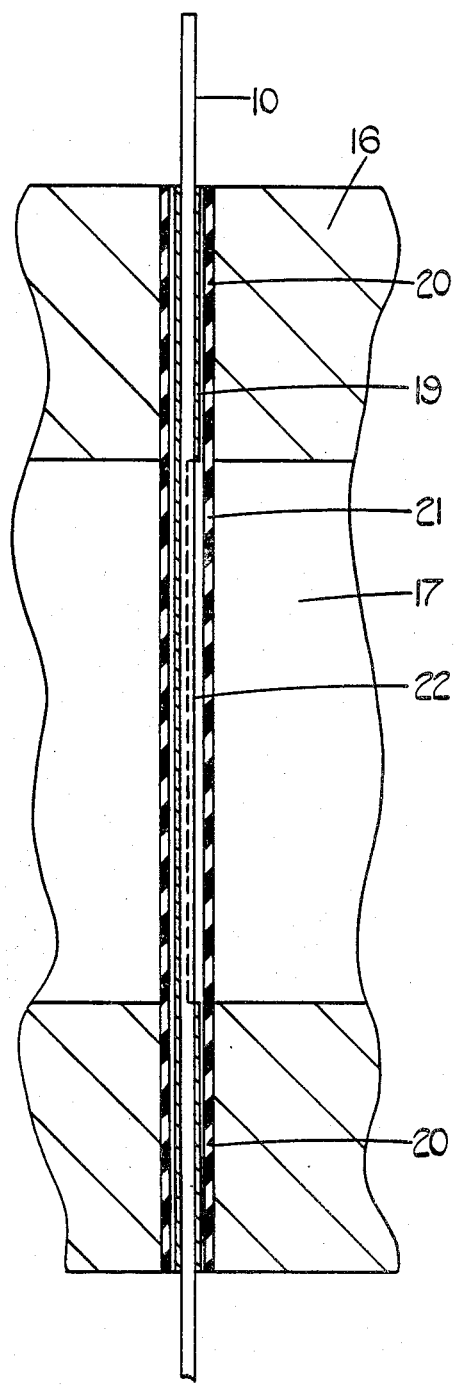
FIG. 3 is a section through part of the clamping device shown in FIG. 2.

The clamping device 15 will now be described in detail with further reference to FIG. 3, it being understood that the clamping device 13 is similar thereto. The clamping device comprises a body 16 (for example, made of steel) in which is formed a fluid chamber 17, a source of pressurised fluid being connected to the chamber in use via a port 18. A plurality of through passages are provided in the body 16, each passage being formed by a respective rigid tube 19 which extends through the fluid chamber 17 and whose ends are received in respective side drillings 20 from the chamber. Each tube 19 receives a respective one of the electrodes 10 therethrough, and is made of electrically conductive material (such as stainless steel) so that electrical power can be supplied to the respective electrode through the tube.

Surrounding each tube 19 is a flexible tube 21, the tube 19 being cut away (as indicated at 22) over half its circumference where it passes through the fluid chamber 17 so as to expose the respective electrode 10 to the flexible tube 21. The ends of the tube 21 are received as a push-fit in the same side drillings 20 as the respective tube 19, the tubes 19 and 21 being glued in position in these drillings. The tubes 21 can be heat-shrunk onto the tubes 19. Each tube 21 is made of a material which is not affected by the fluid (e.g. oil) in the chamber 17 and which permits the tubes 21 to deflect in the direction of the respective electrode 10 under fluid pressure. A particularly suitable material for this purpose is nitrile rubber, although other materials can be used such as silicone rubber or VITON (Registered Trade Mark) rubber.

In order to effect firm clamping of the electrodes 10, the pressure of the fluid in the chamber 17 is increased to, for example, 450 psi. The fluid pressure acts on the flexible tubes 21 and deflects them against the electrodes 10 through the cut-away portions 22 of the tubes 19. This in turn urges the electrodes into tight engagement with parts of the tubes 19 facing the cut-away portions 22, so that the electrodes are firmly held in the tubes 19. The tight engagement between the electrodes and the tubes 19 ensures proper electrical contact between these parts, so that electrical power can be supplied to the electrodes by way of the tubes 19 as aforesaid.

During refeeding of the electrodes, the fluid pressure in the clamping device 13 is reduced to, for example, 200 psi so that the electrodes are frictionally held without being firmly clamped in the tubes 19 by the flexible tubes 21. Thus, movement of each electrode through its respective tube 19 is permitted when the end of the electrode contacts the workpiece in the manner described previously.

What is claimed is:

1. A clamping device comprising a body defining therein a chamber in which a fluid is disposed, a plurality of separate through passages in said body for receipt of respective elements to be clamped, each said through passage having a portion which passes through the chamber and which is defined by the interior of a respective tube which completely surrounds said passage, one such tube being provided for each said element to be clamped and at least a part of said tube within said chamber being flexible, and means operative to pressurise said fluid whereby said part of each said tube is deflected inwardly to clamp said respective element therein.

2. The clamping device according to claim 1, wherein said portion of each said through passage is defined by the interior of a respective relatively rigid tube, a respective flexible tube surrounds each said relatively rigid tube, and a part of each said relatively rigid tube is cut away to expose the respective through passage to said respective flexible tube, one such relatively rigid tube and one such flexible tube being provided for each said element to be clamped.

3. The clamping device according to claim 2, wherein said relatively rigid tubes are made of an electrically conductive material, said elements to be clamped are electrodes, and electrical power is supplied to each said electrode by way of said respective relatively rigid tube.

4. The clamping device according to claim 2, wherein each said flexible tube is made of rubber.

5. The clamping device according to claim 2, wherein each said flexible tube is made of nitrile rubber.

6. The clamping device according to claim 1, wherein said means is operative to pressurise said fluid selectively at a first pressure which causes firm clamping of said elements and at a second, lower pressure which causes frictional retention of each said element while allowing movement of said element through the respective tube.

7. The clamping device according to claim 1, wherein said through passages and said respective tubes are arranged in a two-dimensional array in said body.

8. Apparatus for the electrical machining of a workpiece, comprising a plurality of electrodes and a clamping device, said clamping device including a body defining therein a chamber in which a fluid is disposed, a plurality of separate through passages in said body which receive said electrodes respectively, each said through passage having a portion which passes through the chamber and which is defined by the interior of a respective tube which completely surrounds said passage, one such tube being provided for each said electrode and at least a part of said tube within said chamber being flexible, and means operative to pressurise said fluid and thereby deflect said part of each said tube inwardly to clamp the respective electrode, whereby said electrodes can be clamped by said clamping device or advanced through said through passages according to the pressure of said fluid in the chamber.

* * * * *